United States Patent Office 2,810,496
Patented Oct. 22, 1957

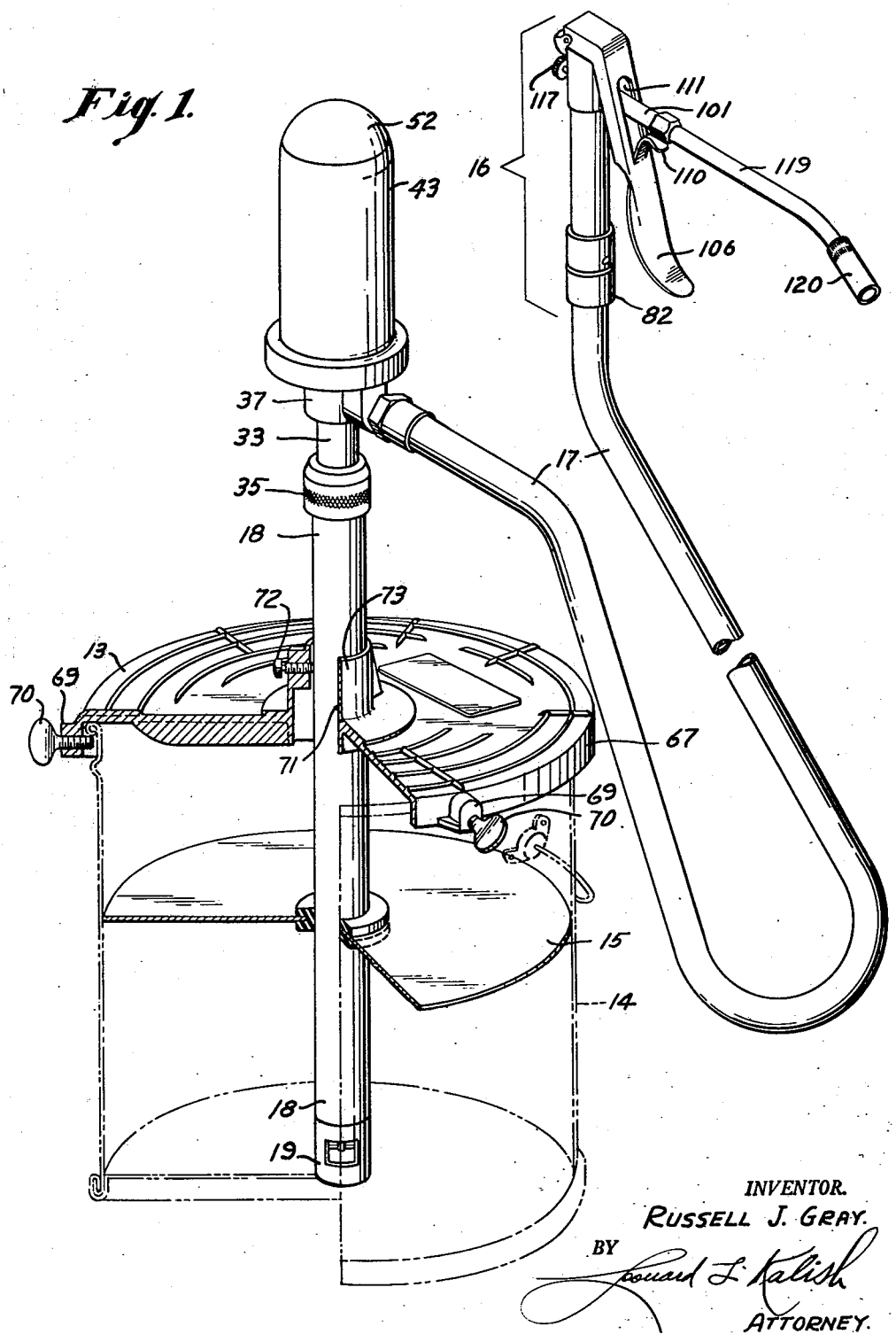

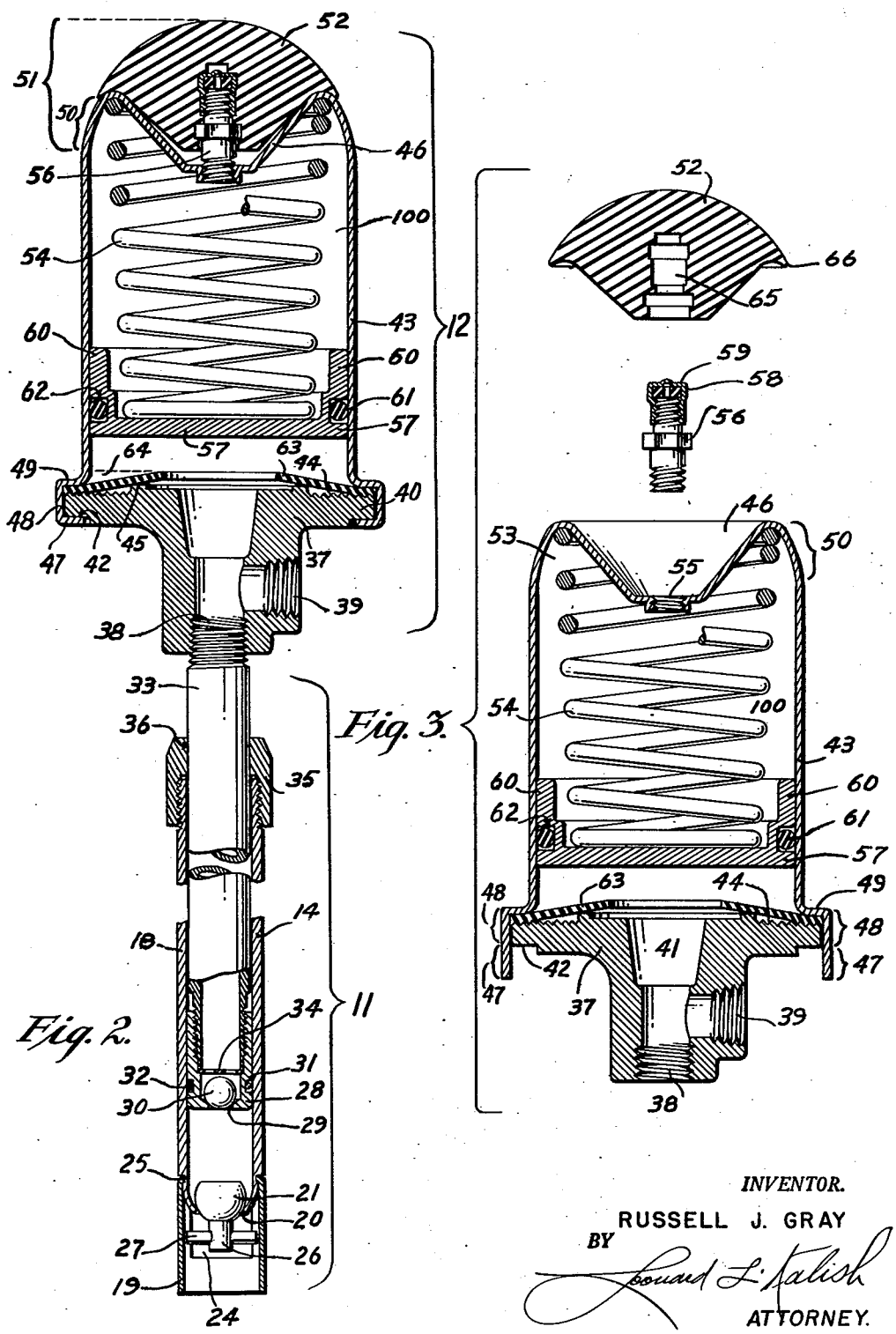

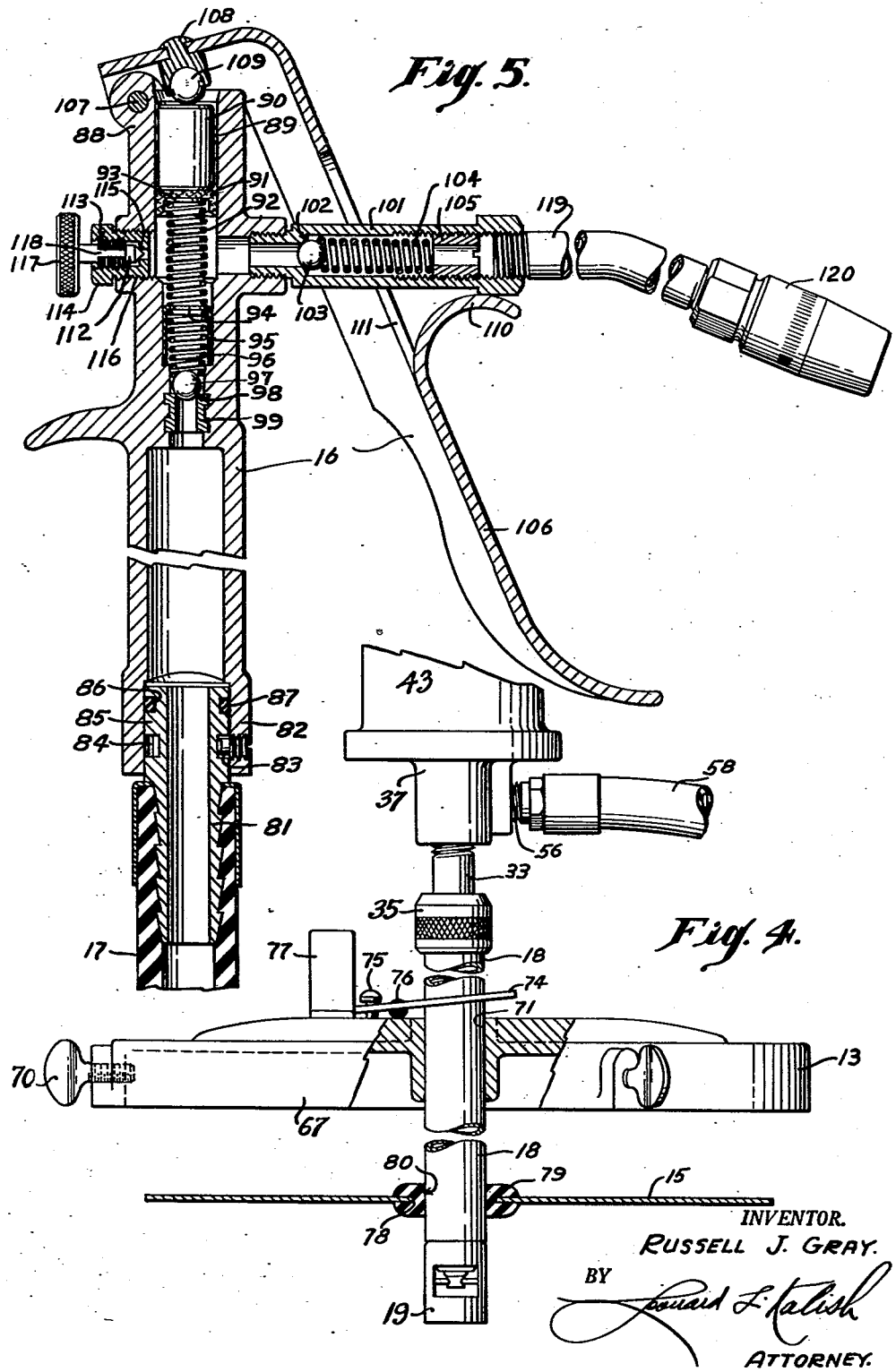

2,810,496

LUBRICANT DISPENSING APPARATUS AND THE LIKE

Russell J. Gray, Meadeville, Minn.

Application February 26, 1954, Serial No. 412,811

18 Claims. (Cl. 222—254)

The present invention relates to certain new and useful lubricant-dispensing apparatus and it relates more particularly to a manually-operable multi-stage lubricant-dispensing apparatus adapted to take viscous lubricants such as greases from the original containers in which they are packaged, stored and delivered, and to deliver the grease into the fittings and through them into the bearings of automobiles and other machinery equipped with fittings adapted to receive quick-attachable and quick-detachable couplers or nozzles through which temporary pressure-retaining sealed connection may be established between the lubricant-passageway leading to the bearing and the delivery or discharge end of the lubricant-dispensing apparatus.

One of the objects of the present invention is lubricant-dispensing apparatus in which lubricant may be manually pumped directly from the original container into a grease-accumulator where it is stored under sufficient pressure to insure its flow from such accumulator or reservoir through the flexible hoses to the manually-operable control-valve and booster-pump from which it is delivered directly to the fitting through the coupler at the end of the coupler-carrying hose or pipe connected with the booster-pump.

Another object of the present invention is to provide a grease-accumulator in which a substantial quantity of grease may be stored under relatively high pressure, namely, a volume of grease, and at a pressure, which cannot be conveniently or practicably delivered by a single manually-powered pumping-stroke within the necessary limitations of relatively small and inexpensive lubricant-dispensing apparatus.

Another object of the present invention is to provide a relatively large-diametered grease-accumulator cylinder with a grease-pressuring piston therein of like large diameter, and resilient means on the back of the accumulator-piston for yieldably resisting or opposing its displacement within the grease-accumulator by the inflow of grease charged into the grease-accumulator against the other side of such accumulator-piston, and a relatively small-diametered manually-operable pump connected with the inlet of said grease-accumulator, whereby such pump may be operated through successive grease-charging strokes thereof with a relatively small amount of manual force to overcome the relatively large-diametered accumulator-piston which is displaced by the manually-powered grease-charging strokes of the pump; whereby a relatively large volume of grease at relatively high pressure is accumulated in the grease-accumulator, from where it is then passed through the hose and booster-pump (and into the bearing) by the operation of the booster-pump.

Other objects of the present invention will appear more fully from the following description and the accompanying drawings.

In the accompanying drawings, in which like reference characters indicate like parts:

Figure 1 represents a perspective view of the lubricant-dispensing apparatus of the present invention.

Figure 2 represents a section on line 2—2 of Figure 1.

Figure 3 represents an exploded cross-sectional view of the accumulator shown in Figure 2, taken in the same plane as Figure 2.

Figure 4 represents an elevational view of the grease-charging pump 11, accumulator 12 and adjustable supporting lid 13 and pump-stabilizing follower-plate 15; shown partly in section.

Figure 5 represents a cross-sectional view of one embodiment of the booster-pump forming part of the apparatus of the present invention.

The apparatus of the present invention includes a grease-charging pump 11 and a grease accumulator and pressurizer 12, a pump-supporting and positioning platform 13, against which the piston 28 of the grease-charging pump 11 may be pulled on its (upward) return stroke and which also serves as a cover for the original grease pail or drum 14, the grease-follower 15 surrounding the grease-charging cylinder 18 and serving both to stabilize it within the original container 14 and to prevent the body of the grease within the container from cavitating around said cylinder 18 (particularly as the level of the grease within the container is lowered), a manually-operable booster and control-valve 16 connected with the discharge end of the grease-accumulator 12 by means of the hose 17.

The grease-charging pump 11 includes the cylinder 18, which is of a length such that the foot-valve-cage 19 thereof may rest on the bottom of the grease-pail or drum 14 while its upper end is above the lid-like platform 13 and above the pump-retaining or pump-locking means 73 thereon through which the pump-cylinder 18 extends and is guided and in which it is releasably locked.

The cylinder 18 is preferably formed of a piece of steel tubing or other suitable tubing, and (in the embodiment shown) the lower end of this tubing is flared inwardly as at 20 to form an in-turned valve-seat for the inwardly-opening foot-valve 21. A small annular groove 22 is formed on the outside of the lower end of the cylinder 18, just above the inwardly flared seat-forming portion 20 of the tube 18. A relatively thin-walled metallic tube 19, having one or more lateral openings 24 therein, serves as a "foot" and as a foot-valve-cage for the bottom of the cylinder 18, and may be secured thereto by having its upper end 25 spun into the groove 22. In order that the outer diameter of the tube 19 (which forms the foot-valve-cage) may be kept down to the outer diameter of the tube 18 which forms the pump-cylinder, the outer diameter of said tube 18 is reduced over the lower portion 20 thereof which is flared or spun inwardly to form the valve-seat 20 (as shown particularly in Figure 2) so that the wall-thickness of the inturned valve-seat-forming portion 20 of the tube 18 plus the wall-thickness of the tube 19 will just equal (or be just slightly less than) the original wall-thickness of the cylinder-forming tube 18. By thus keeping the outer diameter of the tube 19 equal to (or no greater than) the outer outer diameter of the cylinder-forming tube 18, the pump 11 may be inserted through the relatively close-fitting holes through the platform 13 and the pump-locking means thereon and through the follower-plate 15.

The valve 21 is provided with a short downwardly-extending stem 26 through which a cross-pin 27 is extended which prevents the valve 21 from losing its operative relationship to the valve-seat 20 by being drawn too high into the cylinder 18 on the upward or intake stroke of the charging-piston 28.

Within the cylinder 18 the generally tubular piston 28 is provided, having an upwardly facing valve-seat 29 therein against which a ball check-valve or other suitable check-valve 30 seats on the upward or intake stroke of the piston 28. The piston 28 is fitted to the inner diameter of the cylinder 18 with suitable sliding fit. A ring-receiving groove 31 is provided in the piston 28, and within this ring-receiving groove an O-ring 32 is operatively disposed to insure a pressure-proof and yet slidable seal between inner wall of the cylinder 18 and the outer wall of the piston 28.

A tubular piston-rod 33, having an outer diameter sufficiently less than the inner diameter of the cylinder 18 as to clear it (without contacting it), has its lower end affixed to the tubular piston 28 as, for instance, by being screw-threadedly connected therewith in the manner indicated in Figure 2. A small shoulder is formed within the interior of the tubular piston 28 against which a perforated or spider-like valve-confining disc 34 rests, and on which shoulder it is firmly held in place by the lower end of the piston-rod-forming tube 33 which is telescoped into the interior of the tubular piston 28 and screw-threaded therein.

To the upper end of the cylinder-forming tube 18 a rod-guiding and piston-confining stop-ring or ferrule 35 may be secured, as, for instance, by having a portion thereof telescoping and screw-threaded onto the upper end of the cylinder-forming tube 18, with the upper portion 36 thereof forming a sliding fit with the outer diameter of the tubular piston-rod 33 but without forming an airtight seal therewith, so that the space between the outer diameter of the tubular piston-rod 33 and the inner diameter of the cylinder 18 is, in effect, vented to the atmosphere so as to prevent the building up of any back-pressure in the slight space between the outer diameter of the piston-rod 33 and the inner diameter of the cylinder 18, which back-pressure would tend to operate against and resist the upward or intake stroke of the piston 28 and rod 33.

To the upper end of the tubular piston-rod 33, the accumulator-base 37 is secured, preferably in co-axial relationship thereto; this securement being achieved by any suitable means, as, for instance, by screw-threading the upper end of the piston-rod 33 into the intake-opening 38 which is co-axially disposed in relation to the accumulator 12. The accumulator-base 37 may be formed of any suitable metallic casting or the like, and is provided with a lateral outlet 39, also preferably screw-threaded, and extending transversely of and preferably at a right angle to the axis of the accumulator-base 37 and of the accumulator 12.

The accumulator-base 37 is provided with a lateral disc-like flange 40, and a charging-passageway 41 extending therethrough and communicating with the inlet 38 and outlet 39 of said base. The outer peripheral portion of the lower surface of the flange 40 is preferably rabbeted as indicated at 42, to a depth (in an axial direction) generally equal to the thickness of the metal of which the accumulator cylinder 43 is formed. The upper surface of the flange is formed with a series of annular tooth-like ridges 44. At a diameter substantially inward from the inner diameter of the accumulator cylinder 43, an annular valve-seat 45 is formed, which annular seat 45 extends slightly above the level of the ridges 44. The annular valve-seat 44 may be of relatively small radial dimension as shown in the drawings, or it may be of relatively greater radial dimension, and may be made of smaller diameter than that shown in the drawings, whereby it would more nearly approach the diameter of the passageway 41.

The accumulator cylinder 43 is preferably formed of sheet metal, such as sheet steel or other suitable sheet metal, and may be formed of a piece of tubing with one end thereof suitably closed to form the inwardly-dished closed end 46 thereof, or it may be formed of a piece of flat sheet metal drawn into the cylindrical shape with one end closed as at 46. The accumulator-cylinder 43 may also be formed by drawing or otherwise forming it out of a billet or slug of a suitable ductile metal. When drawn, and before being mounted upon the accumulator-base 37, the flange portion 47 is disposed cylindrically and in alignment with and of the same diameter as the flange-portion 48; both flange-portions 47 and 48 being then at a suitably larger diameter than the diameter of the main cylindrical body of the accumulator-cylinder 43, so as to form the transverse shoulder 49.

The closed end of the accumulator cylinder 43 is preferably flared inwardly slightly, as at 50, in the zone which is juxtaposed to the inwardly-dished closure 46 thereof, so as to form a more or less continuous rounded exterior thrust-portion 51 in combination with a rubber or other resilient knob or pad 52 which is nested into the inwardly-dished closure 46, as indicated in Figures 1 and 2. The annular groove 53 formed between the inwardly-flared upper portion 50 of the accumulator housing 43 and the inwardly-dished closure 46, thereof, serves as a spring-abutment or spring-seat for the stationary end of the grease-pressurizing spring 54.

A screw-threaded central opening 55 is provided in the inwardly-dished closure 46 of the accumulator housing 43, and in it a conventional air-valve 56 is screw-threadedly mounted, whereby compressed air may be charged into the accumulator housing 43 in back of the piston 57 which is operatively disposed within said housing 43. Preferably, a screw-cap 58, having a gasket 59 therein, is placed over the inlet end of the air-valve 56, so as to insure against gradual leakage and escape of air through the valve, from within the accumulator-housing 43.

The piston 57 is preferably formed with a more or less cylindrical skirt-portion 60; both the piston 57 and its skirt 60 being fitted to the interior diameter of the cylinder 43 to form an operative sliding fit therewith, such that, with the aid of the O-ring type sealing member 61, the piston 57 may be effectively sealed against the inner wall of the cylinder 43 against the passage of air in one direction or grease in the other direction, while permitting a free sliding relationship between piston 57 and cylinder 43. The piston 57 is provided with an annular ring-receiving groove 62 in which the O-ring 61 is operatively mounted.

While the skirt 60 should be of sufficient axial dimension to stabilize the piston 57 against cocking and binding within the cylinder 43, yet its length (at cylinder diameter) should be such that in the full compression of the spring 54 (at which the convolutions thereof abut each other) the upper end of the skirt 60 (at cylinder diameter) will not reach or enter the inwardly flared portion 50 of the accumulator housing 43.

After the spring 54, piston 57 and O-ring 61 have been mounted in the accumulator-cylinder 43, the accumulator-cylinder 43 is assembled to the accumulator base 37, with an annulus-shaped gasket 63, formed of a suitable grease-resistant flexible but durable material interposed between the lateral flange 49 and the outer grooved peripheral portion of the flange 40 of the accumulator-base 37. When so assembled, the flange-portion 47 is spun or otherwise turned inwardly tightly against the recessed or rabbeted surface 42 on the underside of the flange 40, so as tightly to press the transverse flange 49 against the outer peripheral portion of the gasket 63, thereby to form a fluid-tight seal between the flange 49 of the accumulator housing 43 and the flange 40 of the accumulator-base 37.

The inner portion of the gasket 63 overlies the annular valve-seat 45, so that when the piston 57 has moved to its lowest position, it presses the gasket 63 against the valve-seat 45 at a diameter substantially less than the diameter of the piston 57, thereby to form a seal which entraps grease in an annulus-shaped space 64 formed between the annular valve-seat 45 and the inner diameter of the cylinder 43, which prevents the compressed air within the accumulator-cylinder 43, above the piston 57, from passing by the O-ring 61 and out through the passageway 41 into the hose 17. This helps to insure the retention of the compressed air charged into the accumulator-cylinder 43 (after it has been charged with compressed air, to place it into operative condition).

The rubber or other resilient thrust-pad 52 is provided with an axial recess 65, preferably of a contour corresponding generally to the outer contour of the air-charging valve 56 and the cap 58 thereof, and is sufficiently resilient and stretchable at least in the lower tapered portion thereof, to permit it to be telescoped over the valve 56 and cap 58 and so as to adhere thereto and to be held in place thereby when so telescoped over it; yet permitting the removal or detachment of the pad 52. The pad 52 is also preferably provided with an annular flange or lip-like portion 66, overlapping the end of the accumulator housing 43, so as to form (with the inwardly flared portion 50 of the housing 43) a more or less uninterrupted spherical or otherwise rounded surface against which the palm of the hand of the operator may be pressed, with minimum discomfort to the operator.

A typical (although, of course, not the only) ratio or relationship between the diameters of the pistons 28 and 57, is three-quarters of an inch for the piston 28 and three inches for the piston 57. By providing a spring-strength for the spring 54 such as would exert a spring-pressure of 10 to 25 pounds (more or less) upon the piston 57, and by charging 100 pounds (more or less) of compressed air or other compressed gas into the accumulator-housing 43, in the upper or spring chamber 100 thereof (when the piston 57 is in its lowest position), a combined spring-and-air force is exerted upon the piston 57 which is equal to the combined force of the spring and the air pressure multiplied by the area of the piston 57. Conversely, the pressure to which the grease is subjected within the accumulator-housing 43 (beneath the piston 57) is equal to the force of the spring 54 divided by the area of the piston, plus the pressure of the air which has been charged into the spring-chamber 100 of the accumulator housing 43 (as, for instance, 100 pounds per square inch). By this means, the piston 57 will exert a pressure upon the grease which will be somewhat above the air-pressure within the spring-chamber 100, namely, above the air-pressure by an amount which is equal to the spring force divided by the area of the piston 57.

Assuming this combined pressure-per-square-inch on the grease to be of the order of 125 pounds, the downward manual force which must be exerted upon the push-pad 52 at the top of the accumulator housing 43 will be equal to such pounds-per-square-inch exerted upon the grease by the piston 57, multiplied by the area of the piston 28. Thus, with the diameter of the piston 28 being approximately three-quarters of an inch, its area is approximately four-tenths of a square inch (0.4"). Thus, with the piston 57 exerting a pressure of approximately 125 pounds per square inch on the grease, the downward manual force which must be exerted upon the push-pad 52 to force the grease into the accumulator 12 will be only approximately 55 pounds; a downward force which an average person can exert without undue strain. By reducing the diameter of the piston 28 still further, this charging-force may be further reduced, while still maintaining the pounds-per-square-inch of pressure exerted by the piston 57 upon the accumulated grease at the relatively high pressure required to insure the passage of the grease through the hose 17 into the booster-pump 16.

The lid-like platform 13 is preferably provided with a downwardly extending flange 67 which is adapted to telescope over the upper generally outwardly beaded flange 68 of the grease-pail or drum 14, and is provided with three or more thickened boss-like enlargements 69 through which generally radial screw-threaded holes are extended, through which winged set-screws or lock-screws 70 are extended to engage beneath the beaded upper end of the grease-pail or drum 14, thereby detachably to lock the pump-platform 13 to the pail or drum 14, so that when pulling the accumulator 12 and the piston-rod 33 upwardly, an operative relationship is insured between the cylinder 18 and its lower intake, and the bottom of the pail 14.

A central aperture 71 is provided in the platform 13, to fit the outer diameter of the pump-cylinder 18 with a neat sliding fit. A winged lock-screw or set-screw 72 may be extended through the tubular extension 73 of the lead like platform 13, through which the vertical aperture 71 extends, to lock the cylinder 18 in position, in relation to the platform 13, so that its bottom is at the bottom of the container 14.

In the modification shown in Figure 4, a friction type retainer-disc 74 may be provided in place of the set-screw 72. In this modification, the tubular extension 73 is largely beneath the disc-like platform 13 rather than above it, and the retainer disc 74 is provided with an aperture of a diameter which will neatly fit the outer diameter of the pump-cylinder 18. The retainer disc 74 is loosely anchored at one end by a rivet or screw 75 extending loosely through an aperture therein and secured to the platform 13. A spring or a small rubber ball 76 inserted between the disc 74 and the platform 13 serves resiliently to deflect or urge the disc 74 in an upward direction, about the rivet or screw 75 as a pivot, thereby to cock the disc 74 in relation to the outer surface of the pump-cylinder 18. By this means, the pump-cylinder may be freely pushed down into the aperture 71 and through the disc 74, without the disc gripping the outer surface of the pump-cylinder 18 when it is pushed past it in the downward direction; while locking it against any upward withdrawing movement in relation to the platform or lid 13, unless the outer or free end of the disc 74 is first depressed manually so as to bring the disc into a more or less horizontal position, in which case the locking action of the disc upon the outer surface of the pump-cylinder 18 is relieved.

A handle 77 may also be provided upon the platform 13, whereby the lubricant-dispensing apparatus may be carried, and whereby also a firm grip may be obtained upon the platform 13 with one hand while withdrawing the accumulator 12 and piston-rod 33, for drawing a charge of grease into the pump-cylinder 18 beneath the piston 28 thereof.

The grease-follower and pump-stabilizing disc 15 is of a diameter neatly or loosely to fit within the inner diameter of the pail or drum 14, and is provided with a central aperture 78 of a diameter preferably substantially less than the pump-cylinder 18. Into this aperture 78 a grease-resistant rubber or other similar grommet 79 is placed, with its flanges flanking the inner periphery of the disc 15 adjacent the central aperture 78 thereof; the inner diameter 80 of the grommet or bushing 79 forming a neat sliding fit with the outer diameter of the pump-cylinder 18, so as to prevent the passage of air between the disc 15 and the outer surface of the pump-cylinder 18 and so as also to give lateral support to the pump-cylinder 18 so as to prevent it from being inclined or cocked in relation to the platform 13.

The booster-pump 16 is preferably swivelably connected to the end of the hose 17 by means of any suitable swivel connection, as, for instance, the hose-stud 81 journaled in the receiving end 82 of the body of the booster-pump 16 and held therein by a set-screw 83 riding in an annular groove 84 of the journaled portion 85 of the hose-stud 81; said journaled portion also having a ring-receiving groove 86 in which an "O" ring 87 is disposed to form a hydraulic seal between the body 82 of the booster-valve and the journaled portion 85 of the base-stud 81.

At the opposite end 88 of the booster-pump 16 is a high-pressure cylinder or cylinder-bore 89, in which is mounted a short high-pressure booster-piston 90, against the inner end of which a hydraulic-sealing resilient cup-washer 91 is operatively held by the spring 92 and the metallic washer 93. The other end of the spring 92 rests against the stationary in-turned flange 94 of the thin sheet-metal spacer-tube 95 which, in turn, holds the valve-closing spring 96 between its in-turned flange 94 and the ball check-valve 97, which later seats against the valve-seat 98 in its closed position; the valve-seat 98 being preferably formed on a separate valve-seat member 99 of suitably hard metal which is preferably cast in place within the hollow bore of the booster-pump body, as shown in Figure 5 (the booster-pump body preferably being die-cast).

The combined pressure of the spring 54 and the compressed air in the chamber 100 within the accumulator-housing 43, upon the grease accumulated in the accumulator 12 (beneath the piston 57 thereof) must be sufficient to lift the check-valve 97 off its seat 98 against the force of the spring 96. The strength of the spring 96 is so proportioned to the strength of the spring 54 and the air-pressure in the chamber 100, in relation to the diameter of the valve-seat 98 (with an allowance for the pressure-drop of the spring 54 and of the air in chamber 100 by reason of expansion of spring and air and with allowance for the friction opposing the passage of grease through the hose 17) that the hydraulic pressure on the intake side of the check-valve 97 (tending to unseat said valve) will always be sufficient to unseat said check-valve 97 so as to fill the high-pressure cylinder 89 of the booster-pump 16 with grease. A discharge-valve housing 101 is either formed integrally with or is screw-threadedly connected to the main booster-pump housing, in communication with the high-pressure cylinder-bore 89 thereof and preferably transversely of the main body of the booster-pump 16. The discharge-valve housing 101 contains a valve-seat 102 against which the discharge check-valve 103 (also preferably of the ball type) is seated by the valve-closing spring 104 held in place by a tubular screw-plug 105 in the threaded bore of the valve-housing 101. The screw-plug 105 is screwed in to an extent sufficient to compress the spring 104 to the point where the discharge-valve 103 will not be unseated by the hydraulic pressure generated within the high-pressure cylinder-bore 89 by the spring 54 and the compressed-air in the chamber 100 (in their greatest compression), so that the discharge check-valve 103 will prevent the grease from discharging from or through the booster-valve 16 solely under the influence of said spring 54 and compressed air, and so as to require the actuation of the high-pressure piston 90 to cause any discharge from the booster-pump 16.

To the pipe-stem 119, connected to the end of the valve housing 101, a quick-attachable and quick-detachable hydraulic coupler or nozzle 120 is secured for temporary attachment or connection with the fittings of the bearings of automobiles, tractors, farm and industrial and other machinery to be lubricated.

A handle 106 is pivotally mounted on the booster-pump housing by means of the pivot 107 and carries a piston-depressing member 108, preferably riveted or otherwise fixedly secured to the pressed-steel handle member 106 near the pivot-end thereof; in which member 108 an anti-friction steel contact-ball 109 is rotatably mounted. The steel ball 109 in turn bears against the end of the high-pressure booster-piston 90.

The pressed-steel handle 106 has a stop-member or tongue 110 struck therefrom or pressed outwardly therefrom (as shown particularly in Figure 5) to serve as a deflection-limiting means for the handle 106 and also to provide an elongated opening 111 in the handle 106 through which the discharge-valve housing 101 may freely extend without interfering with the movement of the handle 106. The deflection-limiting stop-member 110 comes to rest against the underside of the discharge-valve housing 101 in its outward position and in the retracted position of the high-pressure booster-piston 90; being urged into that position by the spring 92 which returns the high-pressure booster-piston 90 to its retracted position. To discharge grease, the handle 106 is deflected towards the main body of the booster-pump 16, by gripping both the handle 106 and main body in one hand and squeezing them together.

A relief-valve 112 is preferably provided in communication with the high-pressure cylinder-bore or chamber 89 of the booster-pump. The relief-valve 112 is normally closed but may be opened if and when necessary to relieve any pockets of air which may have been entrapped in the grease and which may interfere with the most effective operation of the booster. The relief-valve 112 is carried by a screw-threaded valve-stem 113 threadedly mounted in a relief-valve housing 114 having a valve-seat 115. The valve-housing 114 is preferably screw-threadedly mounted in the side-opening 116 communicating with the high-pressure cylinder-bore or chamber 89. The valve-stem 113 has a knurled or other suitable knob or handle 117 on its outer end, and has a relief-slot 118 cut lengthwise thereof, across its threaded portion, so that by unscrewing the stem just enough to unseat the valve 112 from the valve-seat 115, any pockets of entrained air will be promptly relieved; whereupon a slight reverse turn of the knob 117 will re-set the valve 112 to its closed position.

The combined force of the compressed gas in the accumulator-chamber 100 and of the spring 54, delivers the grease or other liquid through the hose 17 and past the inlet check-valve 97 of the booster-pump 16, into the high-pressure cylinder-bore 89 thereof, up to (but not past) the outlet check-valve 103 of said booster-pump 16; the strength of the spring 104 in relation to the diameter of the valve-seat 102 being so proportioned that when the pressure upon the grease in the accumulator 12 is at its maximum (with both spring 54 and the compressed-gas within the chamber 100 compressed to their maximum, by the maximum upward displacement of the piston 57), the pressure upon the grease within the cylinder-bore 89 of the booster-pump 16 (generated within the accumulator 12) will fall sufficiently short of the pressure required to unseat the valve 103 as to insure against any free flow of the grease through the coupler or nozzle 120 unless the booster-pump handle 106 is operated. On the other hand, the spring 96 (in relation to the diameter of the inlet valve-seat 98) is sufficiently weak to insure the inlet-valve 97 being raised off its valve-seat by the minimum grease-pressure which the accumulator delivers to the cylinder-bore 89 of the booster 16 when the accumulator-piston 57 is in its lowest position.

In this manner, the grease or other liquid will flow through high-pressure coupler or nozzle 120 only when the handle 106 of the booster is operated to depress the booster-piston; whereby the booster 16 simultaneously both raises the pressure and acts as a control-valve upon the accumulator 12.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described the invention, the following is hereby claimed:

1. Dispensing apparatus for dispensing grease and similar liquids under pressure, including an accumulator for receiving, storing and discharging the liquid under pressure and including a liquid inlet and a liquid outlet, resilient and compressible means within said accumulator adapted to be compressed by the liquid entering the accumulator and adapted thereby to maintain said liquid under pressure corresponding to the compression of said resilient means, a manually-operable accumulator-charging pump having an inlet adapted to extend down into a container of liquid with its inlet disposed in proximity to its bottom thereof and having its discharge end connected with the inlet of said accumulator, and a normally closed and manually openable valve connected with the outlet of said reservoir and arranged to confine liquid in said reservoir under pressure when said valve is not manually operated, and to release liquid from said reservoir under the pressure imposed on said liquid by said resilient and compressible means, through said valve, when said valve is manually operated; said accumulator being so arranged on said accumulator-charging pump as to form a handle therefor.

2. Dispensing apparatus for dispensing grease and similar liquids under pressure, including an accumulator for receiving, storing and discharging the liquid under pressure, comprising a cylinder closed at both ends, a piston therein dividing it into a liquid-chamber and a pressure-generating chamber, means in the latter chamber for exerting a continuous though variable force upon said piston urging it towards the liquid chamber portion of said cylinder so as to tend to reduce the size of said liquid-chamber and to increase the size of said pressure-generating chamber, a liquid inlet and a liquid outlet communicating with said liquid-chamber in said accumulator-cylinder and a manually-operable accumulator-charging pump having its outlet connected with the liquid-inlet of said accumulator; the effective diameter of the piston of said pump being substantially smaller than the effective diameter of the piston of said accumulator.

3. Dispensing apparatus for dispensing grease and similar liquids under pressure, including an accumulator for receiving, storing and discharging the liquid under pressure, comprising a cylinder closed at both ends, a piston therein dividing it into a liquid-chamber and a pressure-generating chamber, means in the latter chamber for exerting a continuous though variable force upon said piston urging it towards the liquid chamber portion of said cylinder so as to tend to reduce the size of said liquid-chamber and to increase the size of said pressure-generating chamber, a liquid inlet and a liquid outlet communicating with said liquid-chamber in said accumulator-cylinder and a manually-operable accumulator-charging pump having its outlet connected with the liquid-inlet of said accumulator; the diameter of the piston of said accumulator-charging pump being not more than one-half the diameter of the piston of said accumulator.

4. Dispensing apparatus for dispensing grease and similar liquids under pressure, including an accumulator for receiving, storing and discharging the liquid under pressure and including a liquid inlet and a liquid outlet, a manually-operable accumulator-charging pump having a cylinder adapted to extend down into a container of liquid with its inlet disposed in proximity to its bottom thereof and having its discharge end connected with the inlet of said accumulator, and a booster-pump connected with the outlet of said accumulator and arranged to control the flow of liquid therefrom and to boost the pressure of the liquid above the pressure imposed thereon by the accumulator.

5. Dispensing apparatus for dispensing grease and similar liquids under pressure, including an accumulator for receiving, storing and discharging the liquid under pressure and including a liquid inlet and a liquid outlet, and a manually-operable accumulator-charging pump having a cylinder adapted to extend down into a container of liquid with its inlet disposed in proximity to its bottom thereof and having its discharge end connected with the inlet of said accumulator, said accumulator and said accumulator-charging pump being so arranged in relation to each other that said accumulator forms an operating handle for said pump, and a booster-pump arranged to control the flow of liquid from said accumulator and to boost the pressure of said liquid.

6. Dispensing apparatus for dispensing grease and similar liquids under pressure, including an accumulator for receiving, storing and discharging the liquid under pressure and including a liquid inlet and a liquid outlet and having a piston therein dividing it into a liquid-chamber and a pressure-generating chamber, a manually-operable accumulator-charging pump having a cylinder adapted to extend down into a container of liquid with its inlet disposed in proximity to its bottom thereof and having its discharge end connected with the inlet of said accumulator, said accumulator and said accumulator-charging pump being so arranged in relation to each other that said accumulator forms an operating handle for said pump, and a booster-pump connected with the outlet of said accumulator.

7. Dispensing apparatus for dispensing grease and similar liquids under pressure, including an accumulator for receiving, storing and discharging the liquid under pressure, comprising a cylinder closed at both ends, a piston therein dividing it into a liquid-chamber and a pressure-generating chamber, means in the latter chamber for exerting a continuous though variable force upon said piston urging it towards the liquid chamber portion of said cylinder so as to tend to reduce the size of said liquid-chamber and to increase the size of said pressure-generating chamber, a liquid inlet and a liquid outlet communicating with said liquid-chamber in said accumulator-cylinder and a manually-operable accumulator-charging pump having its outlet connected with the liquid-inlet of said accumulator; the effective diameter of the piston of said pump being substantially smaller than the effective diameter of the piston of said accumulator, said accumulator and said accumulator-charging pump being so arranged in relation to each other that said accumulator forms an operating handle for said pump.

8. Dispensing apparatus for dispensing grease and similar liquids under pressure, including an accumulator for receiving, storing and discharging the liquid under pressure, comprising a cylinder closed at both ends, a piston therein dividing it into a liquid-chamber and a pressure-generating chamber, means in the latter chamber for exerting a continuous though variable force upon said piston urging it towards the liquid chamber portion of said cylinder so as to tend to reduce the size of said liquid-chamber and to increase the size of said pressure-generating chamber, a liquid inlet and a liquid outlet communicating with said liquid-chamber in said accumulator-cylinder, a manually-operable accumulator-charging pump having its outlet connected with the liquid-inlet of said accumulator; the effective diameter of the piston of said pump being substantially smaller than the effective diameter of the piston of said accumulator, and a booster-pump connected with the outlet of said accumulator.

9. Dispensing apparatus for dispensing grease and similar liquids under pressure, including an accumulator for receiving, storing and delivering the liquid under pressure and having a manually-operable accumulator-charging pump having a cylinder adapted to extend down into a container of liquid with its inlet disposed in proximity to the bottom thereof and having a tubular piston-rod extending above said cylinder and adapted to deliver the pumped liquid-charge from said cylinder, said piston-rod having its discharge end connected with the inlet of said accumulator.

10. Dispensing apparatus for dispensing grease and similar liquids under pressure, including an accumulator for receiving, storing and delivering the liquid under pressure and having a liquid inlet and a liquid outlet, said accumulator having movable means dividing its interior into a closed liquid chamber and a closed divider-loading chamber, the latter chamber having means therein for applying a force upon said divider-means tending to move it in the direction of the liquid-chamber so as to reduce the liquid-chamber and to increase the divider-loading chamber, a manually-operable accumulator-charging pump having a cylinder adapted to extend down into a container of liquid to be dispensed, with the inlet of said cylinder disposed in proximity to the bottom of said container, having a piston within said cylinder, and having a tubular piston-rod connected with said piston and extending from and above said cylinder and adapted to deliver the pumped liquid-charge from said cylinder, said piston-rod having its discharge-end connected with the inlet of said accumulator.

11. Dispensing apparatus for dispensing grease and similar liquids under pressure, including an accumulator for receiving, storing and delivering the liquid under pressure and having a liquid inlet and a liquid outlet, said accumulator having movable means dividing its interior into a closed liquid chamber and a closed divider-loading chamber, the latter chamber having means therein for applying a force upon said divider-means tending to move it in the direction of the liquid chamber so as to reduce the liquid chamber and to increase the divider-loading chamber, a manually-operable accumulator-charging pump having a cylinder adapted to extend down into a container of liquid to be dispensed, with the inlet of said cylinder disposed in proximity to the bottom of said container, having a piston within said cylinder, and having a tubular piston-rod connected with said piston and extending from and above said cylinder and adapted to deliver the pumped liquid-charge from said cylinder, said piston-rod having its discharge-end connected with the inlet of said accumulator, and a booster-pump connected with the liquid outlet of said accumulator and manually operable to control the egress of liquid from said accumulator and to raise the pressure of the liquid above that developed upon the liquid by the accumulator.

12. Dispensing apparatus for dispensing grease and similar liquids under pressure, including an accumulator for receiving, storing and delivering the liquid under pressure and having a liquid inlet and a liquid outlet, said accumulator having movable means dividing its interior into a closed liquid chamber and a closed divider-loading chamber, the latter chamber having means therein for applying a force upon said divider-means tending to move it in the direction of the liquid chamber so as to reduce the liquid chamber and to increase the divider-loading chamber, a manually-operable accumulator-charging pump having a cylinder adapted to extend down into a container of liquid to be dispensed, with the inlet of said cylinder disposed in proximity to the bottom of said container, having a piston within said cylinder, and having a tubular piston-rod connected with said piston and extending from and above said cylinder and adapted to deliver the pumped liquid-charge from said cylinder, said piston-rod having its discharge-end connected with the inlet of said accumulator, and a booster-pump connected with the liquid outlet of said accumulator, said booster-pump having a spring-loaded outlet check-valve whose spring-loading in relation to its seat-size is such that it will not be unseated by the maximum pressure generated by the accumulator, and said booster-pump having a cylinder-bore and a manually-operable high-pressure piston therein for forcing the liquid past the aforesaid outlet check-valve at a pressure substantially above that generated by the accumulator, and a check-valve intermediate said cylinder-bore of said booster-pump and said accumulator permitting the passage of liquid from the accumulator into said cylinder-bore under the minimum pressure generated by said accumulator, while closing in the reverse direction.

13. Dispensing apparatus for dispensing grease and similar liquids under pressure, including an accumulator for receiving, storing and delivering the liquid under pressure, and having a liquid inlet and a liquid outlet, dividing means dividing the interior of said accumulator into a liquid-chamber and a compression chamber, each of said chambers being fully closed, a charging-valve communicating with the compression-chamber portion of said accumulator for charging compressed gas thereinto and retaining said compressed gas therein, a compression spring within said compression chamber, both said compressed gas and said compression spring being operative upon said dividing means to urge it in the direction of the liquid-chamber portion of said accumulator thereby to impose pressure upon the liquid in said liquid-chamber, a manually-operable accumulator-charging pump having a cylinder, a piston therein and a manually-operable piston-rod and having its outlet connected with the liquid inlet of said accumulator, the effective area of said pump-piston being substantially less than the effective area of said accumulator-dividing means.

14. Dispensing apparatus for dispensing grease and similar liquids under pressure, including an accumulator for receiving, storing and delivering the liquid under pressure and having a liquid inlet and a liquid outlet, said accumulator having movable means dividing its interior into a closed liquid chamber and a closed divider-loading chamber, the latter chamber having means therein for applying a force upon said divider-means tending to move it in the direction of the liquid chamber so as to reduce the liquid chamber and to increase the divider-loading chamber, a manually-operable accumulator-charging pump having a cylinder adapted to extend down into a container of liquid to be dispensed, with the inlet of said cylinder disposed in proximity to the bottom of said container, having a piston within said cylinder, and having a tubular piston-rod connected with said piston and extending from and above said cylinder and adapted to deliver the pumped liquid-charge from said cylinder, said piston-rod having its discharge-end connected with the inlet of said accumulator, the effective area of the piston of said accumulator-charging pump being substantially less than the effective area of said accumulator-dividing means.

15. Dispensing apparatus for dispensing grease and similar liquids under pressure, including an accumulator for receiving, storing and delivering the liquid under pressure, and having a liquid inlet and a liquid outlet, dividing means dividing the interior of said accumulator into a liquid-chamber and a compression chamber, each of said chambers being fully closed, a charging-valve communicating with the compression-chamber portion of said accumulator for charging compressed gas thereinto and retaining said compressed gas therein, a compression spring within said compression chamber, both said compressed gas and said compression spring being operative upon said dividing means to urge it in the direction of the liquid-chamber portion of said accumulator thereby to impose pressure upon the liquid in said liquid-chamber, a manually-operable accumulator-charging pump having a cylinder, a piston therein and a manually-operable piston-rod and having its outlet connected with the liquid inlet of said accumulator, the effective area of said pump-piston being substantially less than the effective area of said accumulator-dividing means, and a booster-pump arranged to control the flow of liquid from said accumulator and to boost the pressure thereof.

16. Dispensing apparatus for dispensing grease and the like as, for instance, from an original container, such as a pail, drum or the like, said dispensing apparatus including a platform adapted to be detachably secured to the top of the container, said platform having a central opening therethrough, a grease-charging pump extending through said central opening and including a cylinder having a foot-valve near the lower end thereof and adapted to have its foot-valved lower end disposed in proximity to the bottom of said container and to have its upper end extend above said platform, said grease-charging pump including a generally tubular piston containing a check-valve, a hollow tubular piston-rod and extending upwardly therefrom and beyond the upper end of said cylinder, and means at the upper end of said cylinder for guiding said piston-rod, means carried by said platform for adjustably and releasably securing said pump-cylinder in the central opening thereof, a follower-plate having a central opening, said cylinder extending through said central aperture of the follower-plate and adapted to be stabilized thereby, a grease-accumulator including a cylinder and a piston therein and having an inlet and an outlet communicating with the interior of said cylinder on one side of said piston, said accumulator being rigidly connected with said piston-rod at its inlet and communicating therewith, said accumulator cylinder being hermetically closed on the other side of the piston thereof and including a compression spring and means for charging compressed air into said accumulator cylinder on the spring-side of the piston thereof and for retaining the so charged compressed-air.

17. Dispensing apparatus for dispensing grease and similar liquids from an original container, such as a pail, drum or the like, said dispensing apparatus including a platform adapted to be detachably secured to the top of the container, said platform having a central opening therethrough, a liquid charging pump including a cylinder extending through said central opening and having a foot-valve near the lower end thereof and adapted to have its foot-valved lower end disposed in proximity to the bottom of said container and to have its upper end extend above said platform and including a generally tubular piston containing a check-valve, a hollow tubular piston-rod connected therewith and extending upwardly therefrom and beyond the upper end of said cylinder and means at the upper end of said cylinder for guiding said piston-rod, means carried by said platform for adjustably and releasably securing said pump-cylinder in the central opening thereof, a follower-plate having a central opening, said pump-cylinder extending through said central opening of the follower-plate and adapted to be stabilized thereby, a liquid-accumulator including a cylinder and a piston therein dividing it into a closed liquid chamber and a closed piston-loading chamber, and having an inlet and an outlet communicating with said liquid-chamber, said accumulator being rigidly connected with said piston-rod with the outlet of said piston-rod in communication with the liquid-inlet of said accumulator, a piston-loading compression-spring in said piston-loading chamber and means for charging compressed gas into the piston-loading chamber of said accumulator-cylinder and for retaining therein the so-charged compressed gas, and a booster-pump, connected with the outlet of said accumulator, having manually operable means for simultaneously controlling the egress of liquid from said accumulator and for raising the pressure thereof above that imposed on it by said accumulator.

18. Dispensing apparatus for dispensing grease and similar liquids from an original container, such as a pail, drum or the like, said dispensing apparatus including a platform adapted to be detachably secured to the top of the container, said platform having a central opening therethrough, a liquid charging pump including a cylinder extending through said central opening and having a foot-valve near the lower end thereof and adapted to have its foot-valved lower end disposed in proximity to the bottom of said container and to have its upper end extend above said platform and including a generally tubular piston containing a check-valve, a hollow tubular piston-rod connected therewith and extending upwardly therefrom and beyond the upper end of said cylinder and means at the upper end of said cylinder for guiding said piston-rod, means carried by said platform for adjustably and releasably securing said pump-cylinder in the central opening thereof, a follower-plate having a central opening, said pump-cylinder extending through said central opening of the follower-plate and adapted to be stabilized thereby, a liquid-accumulator including a cylinder and a piston therein dividing it into a closed liquid chamber and a closed piston-loading chamber, and having an inlet and an outlet communicating with said liquid-chamber, said accumulator being rigidly connected with said piston-rod with the outlet of said piston-rod in communication with the liquid-inlet of said accumulator, a piston-loading compression-spring in said piston-loading chamber and means for charging compressed gas into the piston-loading chamber of said accumulator-cylinder and for retaining therein the so-charged compressed gas, and a booster-pump, connected with the outlet of said accumulator, having manually operable means for simultaneously controlling the egress of liquid from said accumulator and for raising the pressure thereof above that imposed on it by said accumulator; said liquid-charging pump and said accumulator being so arranged in relation to each other that the accumulator forms a handle for operating the pump.

References Cited in the file of this patent

UNITED STATES PATENTS

| | | |
|---|---|---|
| 2,347,932 | Bush | May 2, 1944 |
| 2,406,197 | Christensen | Aug. 20, 1946 |
| 2,557,247 | Ziherl | June 19, 1951 |
| 2,567,496 | Pittenger | Sept. 11, 1951 |
| 2,592,613 | Snyder | Apr. 15, 1952 |
| 2,655,287 | Campbell | Oct. 13, 1953 |